(No Model.) 2 Sheets—Sheet 1.

T. WARD.
COMBINED PLOW, &c.

No. 244,504. Patented July 19, 1881.

Attest:
Herm. Lauten.
H. J. Abbot.

Inventor:
Thomas Ward
by Wm. G. Henderson
Attorney.

N. PETERS. Photo-Lithographer, Washington, D. C.

(No Model.)

2 Sheets—Sheet 2.

T. WARD.
COMBINED PLOW, &c.

No. 244,504.

Patented July 19, 1881.

Attest:
Herm. Lauten
H. Abbot

Inventor:
Thomas Ward
by Henderson
Attorney

UNITED STATES PATENT OFFICE.

THOMAS WARD, OF HARPER, NORTH CAROLINA.

COMBINED PLOW, &c.

SPECIFICATION forming part of Letters Patent No. 244,504, dated July 19, 1881.

Application filed March 2, 1881. (No model.)

*To all whom it may concern:*

Be it known that I, THOMAS WARD, a citizen of the United States, residing at Harper, in the county of Johnson and State of North Carolina, have invented certain new and useful Improvements in Combined Plow and Cotton-Sweep; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
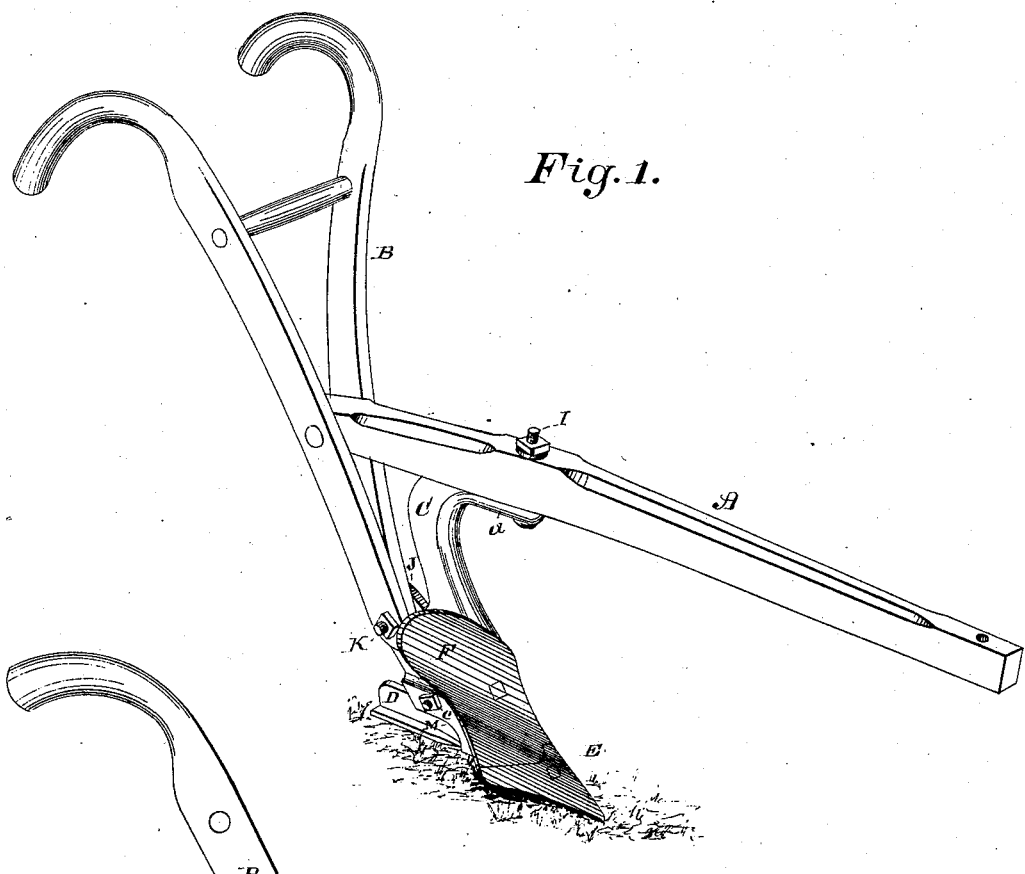
Figure 2:
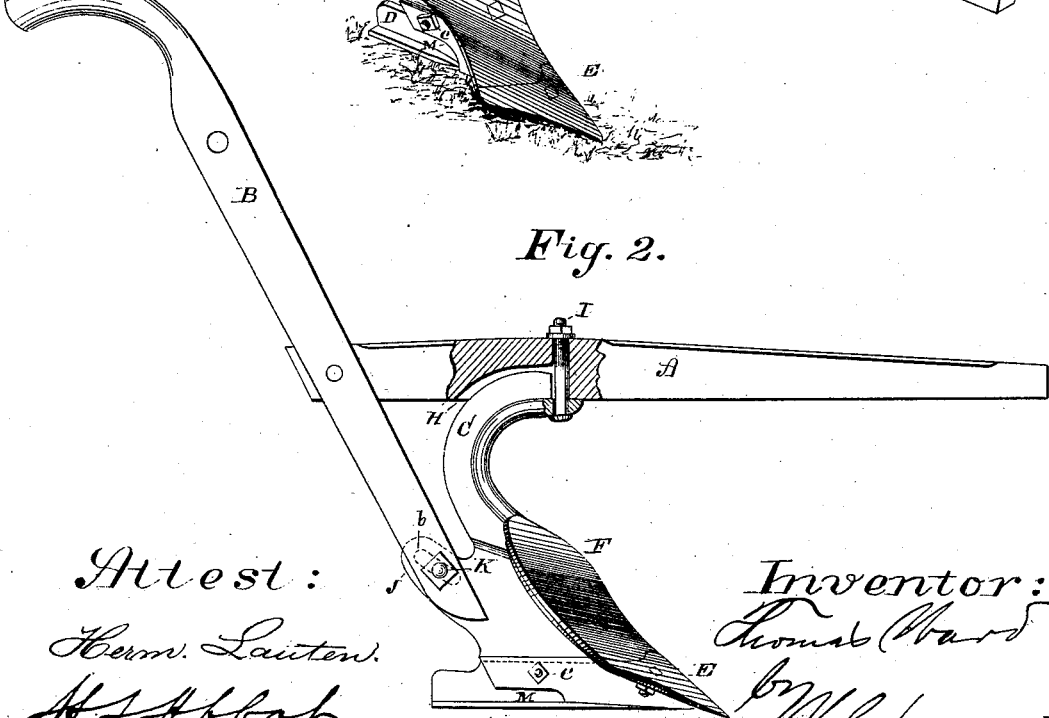
Figure 3:
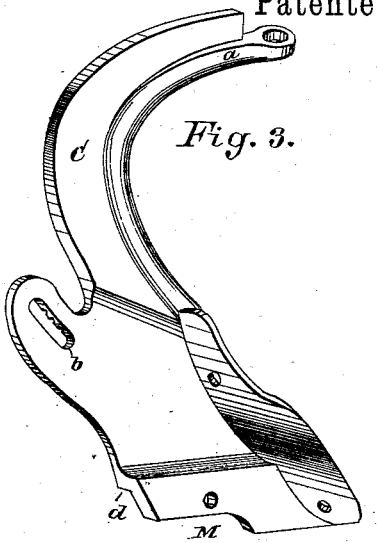
Figure 4:
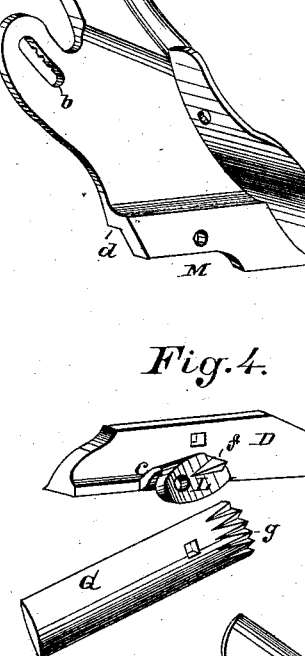
Figure 5:
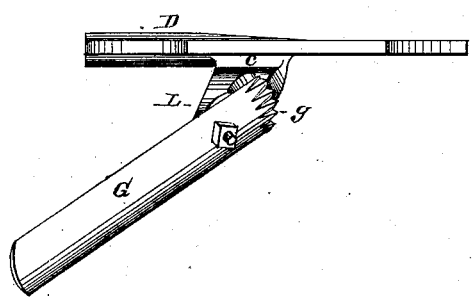
Figure 6:
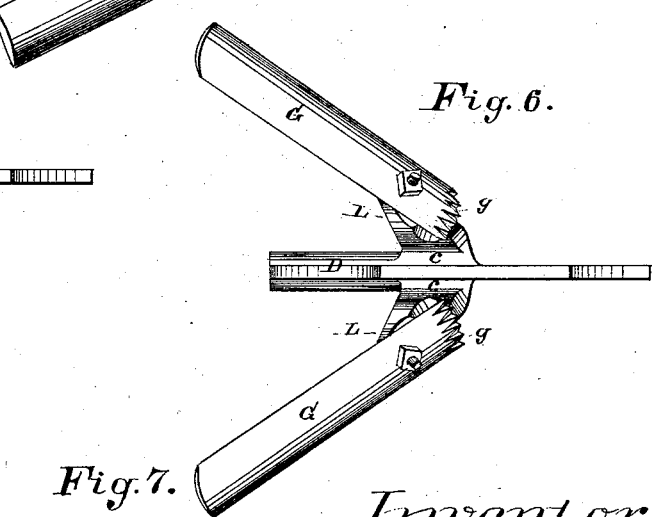
Figure 7:

Figure 1 is a perspective of the plow with sweeps detached; Fig. 2, a side elevation thereof; Fig. 3, a perspective of the standard with all parts separated therefrom; Fig. 4, a perspective of the cotton-sweep and landside-bar separated from the plow and each other; Fig. 5, a plan of the landside-bar and single sweep attached thereto; Fig. 6, a plan of the landside-bar with double sweep attached thereto; and Fig. 7, a perspective of a portion of one sweep, showing the notches or serrations on both sides at one end.

My invention has reference to plows for tilling light soils, the same being adapted to be readily converted into a cotton sweep or plow; and it consists, first, in the construction of the standard, whereby the plow may be given more or less pitch, so as thereby to regulate the depth of the cut; secondly, in the construction whereby, when the plow is held in its normal upright position, the landside is made to cut deeper than the share, so that when the share comes in contact with foreign matter—such, for illustration, as the tough roots of some weeds—the plow, instead of being shoved to one side by such obstruction and passing it by, will continue to be carried straight onward and cut the obstruction in two, that result being attained by reason of the anchorage gained by the additional depth of cut of the landside, the same being sufficient to compensate for and overcome the increased resistance offered by the foreign matter; and, finally, it consists in the construction and combination whereby the device can be used either as an ordinary plow or a cotton-sweeper, according as the mold-board or the sweep is detached, all of which I will now proceed to particularly describe, and then seek to specifically define by the claims.

In the accompanying drawings, the letter A indicates the beam; B, the handles; C, the standard; D, the landside-bar; E, the point and share; F, the mold-board, and G the sweep detached from the landside-bar.

The standard curves near its upper end, as clearly illustrated in Fig. 2, and fits into a mortise, H, formed in the beam from its under side, and is held therein by a bolt and nut, I. The mortise is of such length as to permit the standard to be moved back and forth or up and down therein, and the standard is provided with a flange, $a$, that bears against the under side of the beam. The standard at the rear of the landside, at the point where the handles are bolted thereto, is provided with an ear, J, which has an elongated slot, $b$, the edges of which are serrated to prevent from turning the head of a bolt, K, which passes through the slot and handles and holds the latter to their place by means of a nut screwed onto the end thereof.

By unscrewing the nuts to bolts I and K the standard can be tilted so as to increase or decrease the pitch of the plow, and thereby regulate the depth of the cut.

To lessen the depth the standard tilts downward and forward, while to increase the depth the movement is the reverse. The curve to the upper part of the standard permits so much of the standard to fit within the mortise formed in the beam that the latter serves as brace against lateral strain on the standard at the point where it is connected to the beam.

In the eastern portion of the State of North Carolina, where the country is flat, the soil is light and gravelly, and many of the plantations are troubled with the rank growth of a vine or weed known as the "cow-itch." This weed has very tough roots, and in plowing the ground with the ordinary plow, having the share to cut to the same depth as the landside, when the share strikes the roots the obstruction is such as to shove the plow to one side, (off to the left,) and the consequence is that the weeds are allowed to remain unsevered from the ground, and the latter is left very unsatisfactorily plowed. From experiment and experience, however, I have discovered that if the landside of the plow is made to cut deeper than the share, it is anchored, as it were, against the other side—that is, it is given a greater purchase against the land—so that when the share runs against the tough roots of the weed the plow, instead of being pushed away to one side, will move straight onward and sever the roots.

In addition to the foregoing great advantage, there is the further advantage of ease in running the plow, for the increased purchase on the landside obviates the necessity of the pressure upon the handles usually required to prevent the plow from sliding to one side.

In Figs. 1 and 2 of the drawings the landside is represented as lower than the share, to effect the results already stated. In a working-plow the landside next to the point is about one inch lower than the cutting-edge of the share.

The landside-bar D is provided with an ear, L, which stands out obliquely to the side of the bar, and so as to leave a depression, c, between the two, in order that the same may be set up into the recess m formed in the lower part of the standard, as shown in Figs. 1, 2, and 3, so that the top edge of the bar may bear against the shoulder d formed in the landside of the standard, and a bolt, e, passed through the two parts for the purpose of holding them together.

The ear is provided with a lug, f, adapted to engage with notches or serrations formed at one end of the sweep, on both sides thereof, so as to aid in holding the sweep to its place and to any adjustment given to it.

If desired, a landside-bar may be used with ears on both sides, so that two sweeps can be used at the same time.

If for any reason the farmer does not care to use the landside-bar with the ear, he can readily detach the same by removing the bolt e and substituting therefor an ordinary landside-bar, such as is illustrated in Figs. 1 and 2.

The sweep G is made with serrations g at one end on both sides, the serrations on one side being between those on the opposite side. The serrations are formed on both sides, so that when one edge of the sweep becomes dull from use the sweep can be reversed and a sharp edge presented. In use the friction of the earth against the under side of the sweep at the cutting-edge will wear the edge off to a sort of bevel, but at the same time the upper surface remains comparatively flat, so that when the surfaces are reversed and the sweep applied to the other side of the plow, assuming that a double sweep is used, the flat or sharp edge is presented to the earth, and when that edge is dulled by use the sweep is reversed to its first position, thereby presenting a sharp edge to the earth, the one edge being sharpened while the other is being dulled.

If a single sweep is used, when one edge becomes dulled the sweep is turned over, so as to present the sharp top edge to the bottom and the dull edge to the top.

The sweep is bolted to the ear L, and is held to any adjustment by the notches therein engaging with the lugs on the ears, as will be apparent from an inspection of the drawings.

It will be observed that the notches on one side are between and not opposite to those on the other side, so that if it be desired to adjust the sweep only half the distance of one notch to another on the same side you have only to reverse the sweep, so as to bring the notch next in order on the reverse side in contact with the lug, which, as will be seen from an inspection of the drawings, will adjust the sweep as desired.

As hereinbefore stated, when the device is to be used only as a plow the sweeps are detached, and when to be used as a sweep the mold-board is detached, so that by detaching the one part or the other the device is readily converted into a plow or sweep, as desired.

Having described my invention, what I claim is—

1. The curved standard C, provided with a flange, a, and with a slot, b, at its rear side, in combination with the plow-beam A, having mortise H, and with the handle B, adjustable in slot b, whereby the pitch of the plow-standard is made adjustable, as set forth.

2. The curved standard C, provided with slotted ear J, in combination with mortised beam A, adjustable handle B, mold-board F, and detachable share E, the cutting-edge of the share being in a materially higher plane than the sole of the landside-bar, whereby the several parts are adapted to operate as set forth.

3. The landside-bar D, having formed on its side as an integral part thereof an ear, L, provided with a lug, f, substantially as and for the purpose specified.

4. The standard C, provided with the recess M, in combination with landside-bar D, provided with ears L, whereby a mold-board plow is adapted to be converted into a cotton-sweep, substantially as specified.

5. The landside-bar D, provided with ear L, having lug f, in combination with the reversible sweep G, having serrations g, substantially as and for the purpose specified.

In testimony whereof I affix my signature in presence of two witnesses.

THOMAS WARD.

Witnesses:
H. S. ABBOT,
WM. G. HENDERSON.